Figure 1:
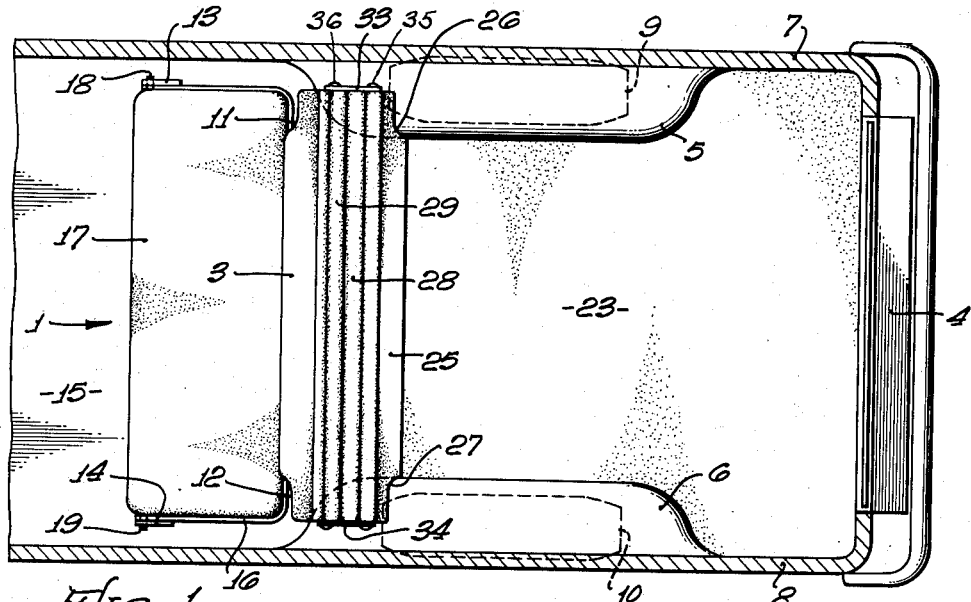

July 16, 1963

G. E. AGUILAR 3,097,881

VEHICLE CUSHION ARRANGEMENT

Filed Jan. 10, 1961

2 Sheets-Sheet 1

INVENTOR.
GILBERT E. AGUILAR
BY
ATTORNEY.

July 16, 1963
G. E. AGUILAR
3,097,881
VEHICLE CUSHION ARRANGEMENT
Filed Jan. 10, 1961
2 Sheets-Sheet 2
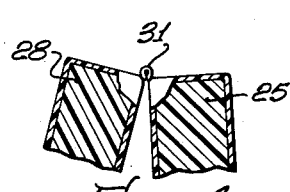
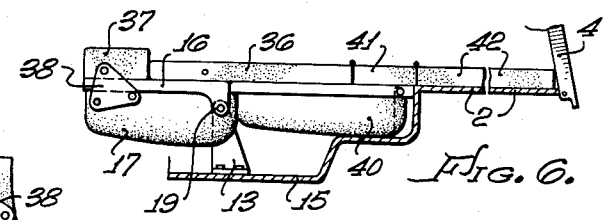
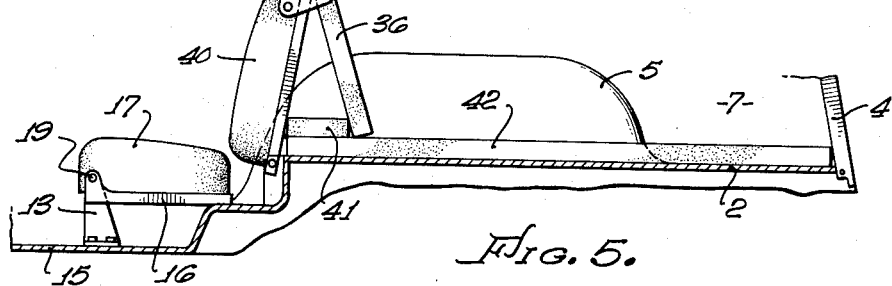
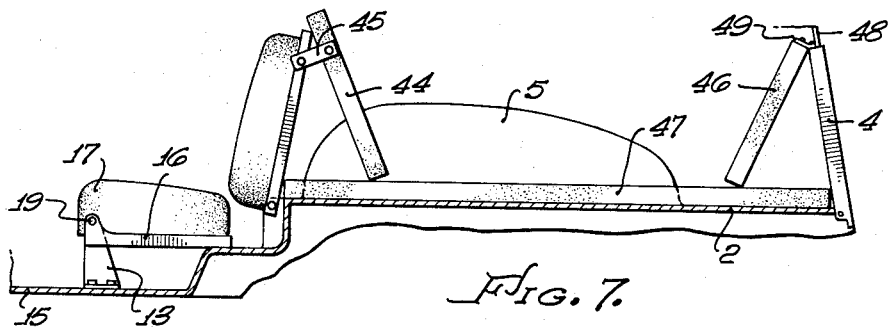
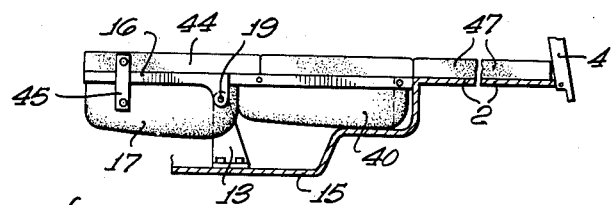
INVENTOR.
GILBERT E. AGUILAR
BY
ATTORNEY.

United States Patent Office 3,097,881
Patented July 16, 1963

3,097,881
VEHICLE CUSHION ARRANGEMENT
Gilbert E. Aguilar, 1150 23rd St.,
Manhattan Beach, Calif.
Filed Jan. 10, 1961, Ser. No. 81,711
6 Claims. (Cl. 296—66)

This invention pertains to an arrangement increasing the seating capacity and safety of a vehicle, as well as providing a unit convertible to form a mattress.

The cushion arrangement of this invention is particularly adapted for use with station wagons. This model car is becoming increasingly popular in view of its high load capacity and its provision of a folding rear seat that permits sleeping and allows the station wagon to be used for camping. The conventional two-seat station wagon includes a space behind the back seat having a flat deck area which may be used to carry luggage or other objects. This horizontal deck may be increased in length by folding the rear seat flat to act as an extension of this area. When a mattress is added over the rear portion of the vehicle, it is possible to sleep comfortably within the station wagon. Obviously, of course, it is necessary to provide some means for storing the mattress during the time the back seat is in use. Also, even though a large group may be traveling in the car, the rear deck area is of no real practical value except for luggage or the like. In other words, although there is a great deal of space within the vehicle in back of the rear seat, it can be used only for storage rather than seating. In addition to being uncomfortable even for children, the exposed surface of the seat back with its usual rigid frame presents a safety hazard in the event of sudden stops.

The three-seat station wagon does not fully solve the problem, one reason being because of its added cost. Also, the third seat is invariably uncomfortable and takes up valuable space even when in the folded position.

According to the provisions of this invention, a cushion unit is provided allowing the use of the area between the tail gate and the second seat for safe, comfortable seating. With the rear seat in the folded position, the unit converts to a mattress. This is accomplished by the use of a plurality of cushion segments including one dimensioned to fit the flat deck area back of the rear seat, and a second that engages the back of the second seat to form an additional seat back facing to the rear. When the second seat is folded the cushion unit forms an extension of the cushion on the deck portion to double as a comfortable mattress.

Accordingly, it is an object of this invention to provide an arrangement for increasing the seating capacity and safety of station wagons.

Another object of this invention is to provide a unit that acts as an extra seat as well as converting to a mattress for a station wagon.

An additional object of this invention is to provide both extra seating and a mattress within a station wagon with virtually no sacrifice of interior volume within the station wagon.

A further object of this invention is to provide a unit having maximum safety in the event of sudden stops of the vehicle.

Yet another object of this invention is to provide a seating and mattress unit of relatively low cost and neat and attractive appearance.

Figure 2:
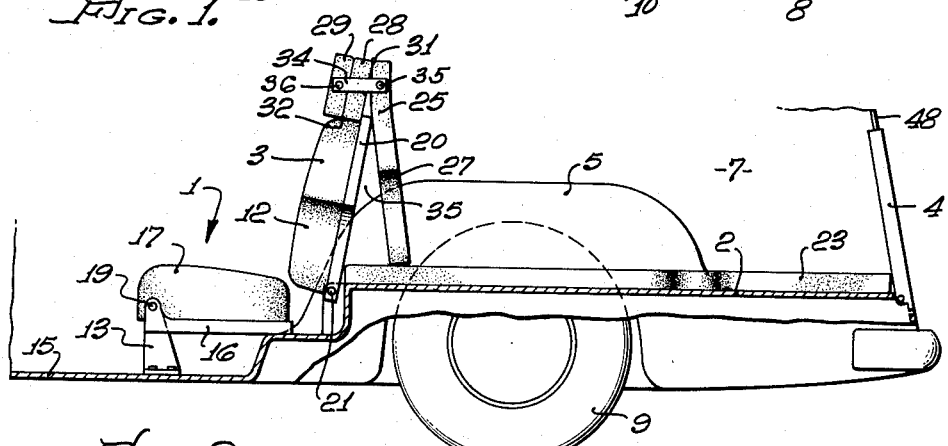
Figure 3:
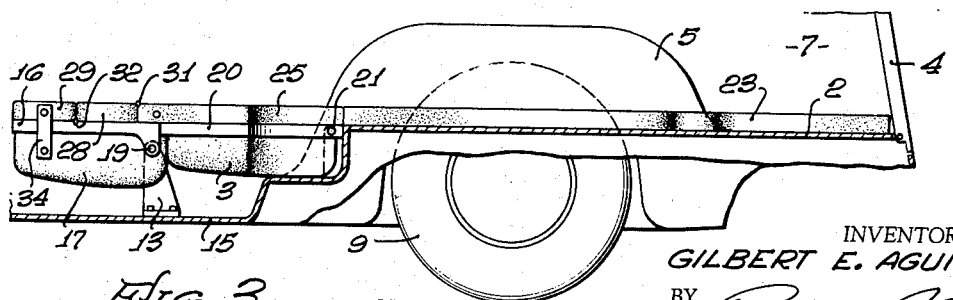

These and other objects will become apparent from the following detailed description taken in connection with the accompanying drawing in which:

FIG. 1 is a top plan view, partially in section, of the rear portion of a station wagon in which the device of this invention is utilized to form a rear seat, FIG. 2 is a side elevational view, partially in section, of the arrangement of FIG. 1, FIG. 3 is a view similar to FIG. 2, but showing the rear seat folded and the unit of this invention acting as a mattress, FIG. 4 is a fragmentary sectional view illustrating the connection between the cushion serving as the seat back and the smaller cushion attached to it, FIG. 5 is a side elevational view partially in section of a slightly modified form of cushion arrangement having a different attachment to the seat back than that of the design of FIGS. 1 and 2, FIG. 6 is a view similar to FIG. 5, but with the rear seat folded and the arrangement of this invention acting as a mattress, FIG. 7 is a side elevational view partially in section of a further modification of the invention including the provision of a cushion at the tail gate of a station wagon, and FIG. 8 is a view of the arrangement of FIG. 7 in the folded position.

The rear portion of the conventional station wagon may be seen in FIGS. 1, 2 and 3 including a back seat 1 located immediately forward of a horizontal flat rear deck 2 that extends between the rearwardly slanting seat back 3 and the tail gate 4 of the station wagon. Wheel wells 5 and 6 project inwardly from the sides 7 and 8 of the station wagon to provide clearance for the rear wheels 9 and 10. Recessed areas 11 and 12 are provided at the bottom portions of the seat back 3 in order to provide clearance for the wheel wells.

Various mechanisms are resorted to in folding the rear seat of a station wagon so as to position it flush with the rear deck area. A common type of pivotal arrangement is shown in FIGS. 1, 2 and 3, including brackets 13 and 14 secured to the floor 15 of the vehicle and at their top ends pivotally engaging the bottom frame 16 of the seat cushion 17 by means of pins 18 and 19. In addition, the frame 20 on the rear face of the seat back 3 is pivotally connected to the vehicle structure by means of pivotal mounting 21 at its lower edge. A suitable detent (not shown) maintains seat back 3 in the raised position of FIGS. 1 and 2. Therefore, when the rear seat is not in use and the rear deck area is to be extended, the seat cushion is pivoted 180° to extend forwardly of the brackets 13 and 14, and the seat back is folded downwardly. This brings the exposed surfaces of the frames 16 and 20 of the seats into alignment with the rear deck 2, extending the length of the deck. Obviously it is necessary for the frames 16 and 20 to include rigid transversely extending sheet portions to enable the surfaces exposed to support loads when the seat is folded. Accordingly, when the seat back 3 is in the raised position, the frame unit 20 presents a hard unyielding surface facing the rear portion of the station wagon. This is an important reason why it has been unsafe for anyone to occupy the rear deck area of the station wagon because of the hazard presented by this rigid surface in the event of a sudden stop.

According to the provisions of this invention a cushion 23 is provided over the rear deck 2 of the station wagon, preferably being coterminous with this space so as to extend between the tail gate 4 and the seat back 3, as well as between sides 7 and 8, and around the wheel wells 5 and 6. The cushion 23 may be of any suitable construction and is advantageously made of resilient foam plastic material covered with vinyl upholstery so as to be comfortable as well as providing a surface that is attractive, durable and readily cleaned.

In addition to the cushion 23, there is included an upstanding cushion element 25 which when the rear seat is in its normal position, as shown in FIGS. 1 and 2, inclines forwardly to engage the top edge of the seat back frame portion 20. There need not be any attachment between the bottom edge of the cushion 25 and the upper surface of the cushion 23. Again, resilient foam material may be utilized, and the thickness of cushion 25 preferably is substantially the same as that of cushion 23. The lower side portions 26 and 27 of cushion 25 are appropriately recessed to provide clearance at the wheel wells 5 and 6.

At the top edge of cushion 25, which is above the top of seat back 3, additional smaller cushion elements 28 and 29 engage the top of the seat back cushion. These auxiliary cushions 28 and 29 extend the width of the seat back 3, and may be attached to cushion 25 and to each other by extensions 31 and 32 of the upholstery material as best illustrated in FIG. 4. This allows accordion folding of the smaller cushions which are pivotally connected to the forward edge of cushion 25. In addition, there are included short straps 33 and 34 which may be formed of vinyl material and are secured by snaps 35 and 36 to the cushion 25 and to auxiliary cushion 29. This holds the auxiliary cushions in the position shown in FIGS. 1 and 2, and also serves to grip the top portion of the frame 20 of the seat back 3. In this manner the cushion assembly 25, 28 and 29 is maintained in the position of FIGS. 1 and 2 so that it is possible to sit comfortably in the rear deck area of the station wagon utilizing cushion 25 as a seat back. Enough body is provided by the cushion 25 so that there is no tendency for it to collapse when it is leaned against. The resultant forces on the cushion when it acts as a back support include downward components urging the cushions 28 and 29 against the top edge of seat back 3. As a result, the assembly is retained in place and will not be dislodged from the top of the seat back 3.

As well as adding to the comfort of children or adults riding in the area between the back seat and the tail gate of the station wagon, the cushion 25 also is a great protection in the event of a sudden stop. The resilience of the cushion effectively prevents injury to anyone driven toward the frame 20 of the seat back 3. Forwardly directed forces from contact with cushion 25 resulting from a quick stop of the vehicle cause the cushion 25 to curve convexly toward the seat back 20 in absorbing the impact load. Again downwardly directed force components will be the result, and the cushion 25 will not become separated from the seat back. The loads on the cushion unit assure that it will be retained precisely in the location where it is most needed to shield the occupant from the rigid frame element 20.

The inclined cushion element 25 results in a small space 35 between this cushion and the seat back 3. This is an immaterial loss in space within the vehicle, but if desired it may be utilized for storing goods.

As a further important feature of the cushion arrangement of this invention, the auxiliary cushions 28 and 29 serve to form an extension of the seat back 3 adding considerably to its height. This makes the rear seat 1 much more comfortable to passengers of the vehicle. An increase in height of the rear seat is particularly important in station wagons where this seat back is customarily quite low because of the necessity for folding the seat assembly flat.

When the seat 1 is folded, as illustrated in FIG. 3, the cushion assembly 25, 28 and 29 is removed from the seat back, and the straps 33 and 34 are unsnapped from either cushion 25 or 29. This cushion assembly then is unfolded and placed immediately in front of the bottom cushion 23. In this manner it forms an extension of cushion 23, resulting in a resilient mattress covering the entire flat portion of the station wagon. When cushion 25 is horizontal, the recesses 26 and 27 enable it to clear the portions of the wheel wells 5 and 6 forward of cushion 23.

Thus in a moment's time a full length, comfortable mattress is formed on the floor of the vehicle. Nevertheless it is not necessary to store any bulky unwieldy objects prior to the use of the mattress because of the manner in which the cushions are separated and utilized prior to the time of conversion of the station wagon. The arrangement of this invention not only adds to the comfort and safety of the passengers of the vehicle, both in the rear deck area and in the back seat, but also provides a mattress when the seat is folded flat.

Of course, the cushion units normally are dimensioned so that the entire rear portion of the station wagon will be covered when the rear seat is folded. This is accomplished easily by properly correlating the lengths and widths of the cushions. Also, while the two auxiliary cushions 28 and 29 have been shown, it is possible to use only one, or even three or more.

A slightly modified form of the invention may be seen in FIGS. 5 and 6. Here a single auxiliary cushion 36 is included at the top of the upstanding cushion 37, rather than the two cushions as illustrated in the previously described embodiment. In addition, the strap element 38 snaps not only to the auxiliary cushion 36 and the main seat back cushion 37, but also snaps to the side of the seat back 40 of the station wagon. This arrangement is particularly desirable where the seat back of the vehicle does not have an upwardly projecting flange on the frame at the rear surface of the seat back. In the absence of this flange there is no portion of the seat back to be gripped between the cushions 36 and 37, so the additional connection to the seat back of the vehicle is needed.

Also shown in FIGS. 5 and 6 is a further arrangement useful for extending the mattress to assure that it covers the entire flat area of the station wagon when the seats are in the folded position. This is accomplished by a short cushion 41 held by a flap of material to the forward end of the principal cushion 42. Therefore, when the seats are folded as in FIG. 6 the cushion 41 is flipped over to be positioned at the forward edge of cushion 42, and cushions 36 and 37 are located in front of the cushion 41. If desired, in this arrangement the cushion 36 may be made slightly thicker than the remaining cushions as illustrated to act as a built-in pillow for the resulting mattress.

The arrangement of FIGS. 7 and 8 shows the provision of only a single upstanding cushion 44 held to the seat back by means of a strap 45. This is optional where added height to seat back 3 is not needed or desired. Also shown in FIGS. 7 and 8 is an additional auxiliary cushion 46 that inclines upwardly from the aft portion of the bottom cushion 47 to engage the top edge of the tail gate. Any suitable attachment may be included to hold the top edge of cushion 46 to the sill of the tail gate below the windowpane 48. In the embodiment shown, snaps are provided along the sill of the tail gate and the edge of the cushion to which a strap 49 is secured. This provides even greater safety for the occupants of the rear portion of the station wagon by preventing injury from contact with the rigid surface of the tail gate. By this design the occupants are protected to the rear as well as at the forward portion of the rear deck area. When the seats are folded, as indicated in FIG. 8, the cushions 44 and 46 are located forward of the cushion 47 to provide the mattress as before.

From the foregoing it is apparent that I have provided an improved cushion arrangement for station wagons or other vehicles having similar seating arrangement whereby the capacity of the vehicle is increased, the safety is enhanced, and a greater passenger comfort is realized.

The foregoing detailed description is to be clearly understood as given by way of illustration and example only, the spirit and scope of this invention being limited solely by the appended claims.

I claim,

1. In a vehicle having a rear seat provided with a back and a substantially flat area rearwardly of said seat back, a cushioning arrangement comprising a first cushion on said flat area adjacent said seat back, a second cushion extending upwardly from said first cushion, said second cushion inclining forwardly and engaging the rear face of the top edge portion of said seat back, the top edge of said second cushion extending above said top edge of said seat back, and a third cushion connected to said top edge of said second cushion and extending downwardly therefrom to engage the top face of said top edge portion of said seat back, thereby to form an extension of said seat back.

2. A device as recited in claim 1 in which said third cushion is pivotally connected to said second cushion, said rear seat is foldable to form an extension of said substantially flat area, and said second and third cushions are dimensioned to fit on said extension of said flat area forwardly of said first cushion.

3. In combination with a vehicle having a seat provided with a back and a substantially flat area rearwardly of said seat back, a cushion arrangement comprising a first cushion disposed over said flat area, a second cushion extending upwardly from said first cushion and engaging the top portion of said seat back, a third cushion at the top edge of said seat back, said third cushion being smaller than said second cushion and engaging said top portion of said seat back, and means attaching said second and third cushions to said top edge portion of said seat back.

4. A device as recited in claim 3 in which said seat is foldable to form an extension of said substantially flat portion, and in which said second and third cushions are removable from said seat back and dimensioned to substantially cover said extension formed by said seat when so folded.

5. In combination with a vehicle having a rear seat having a back, and a substantially flat portion rearwardly of said seat back, a cushion arrangement comprising a first cushion substantially complementarily covering said substantially flat portion, a second cushion extending upwardly from said first cushion, the bottom edge of said second cushion engaging the upper surface of said first cushion and movable relative thereto, a third cushion pivotally connected to and on the forward side of the top edge portion of said second cushion, said third cushion engaging the top edge surface of said seat back, and means for securing said second and third cushions to said top edge portion of said seat back.

6. A device as recited in claim 5 in which said seat back is provided with an upstanding flange at the rear edge thereof interposed between the bottom portions of said second and third cushions, and in which said means for securing said second and third cushions to said seat back comprises removable strap means interconnecting the side edges of said second and third cushions and urging said cushions into gripping engagement with said flange.

References Cited in the file of this patent
UNITED STATES PATENTS

| | | |
|---|---|---|
| 1,608,512 | Kent | Nov. 30, 1926 |
| 1,832,767 | Dameron | Nov. 17, 1931 |
| 2,105,740 | Knudson | Jan. 18, 1938 |
| 2,347,025 | Benzick | Apr. 18, 1944 |